C. F. HUNTOON.
THIRD SUSPENSION FOR BRAKE BEAMS.
APPLICATION FILED APR. 20, 1912.
1,060,842.
Patented May 6, 1913.
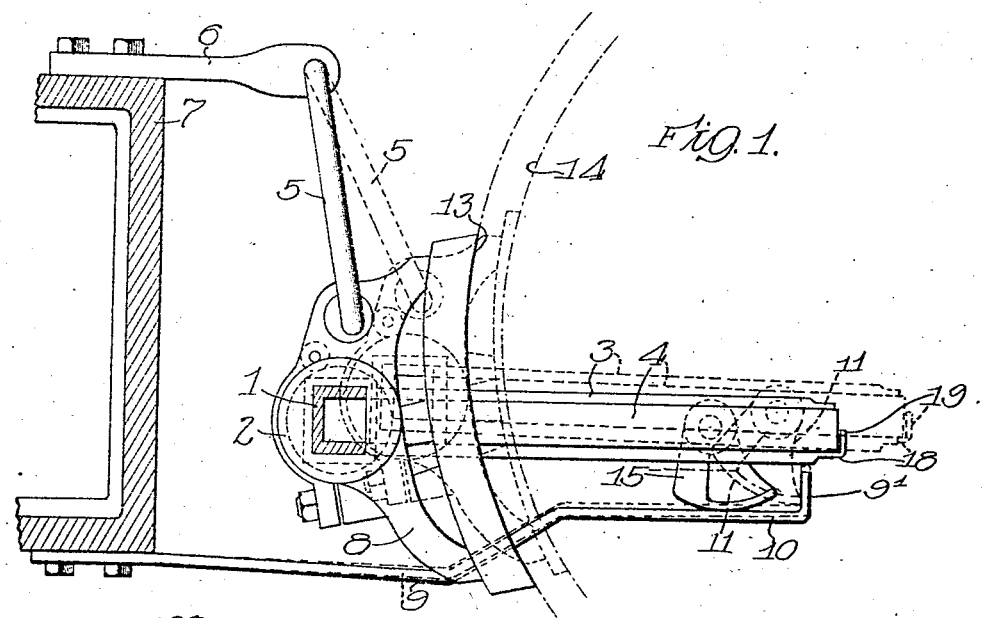
Fig. 1.
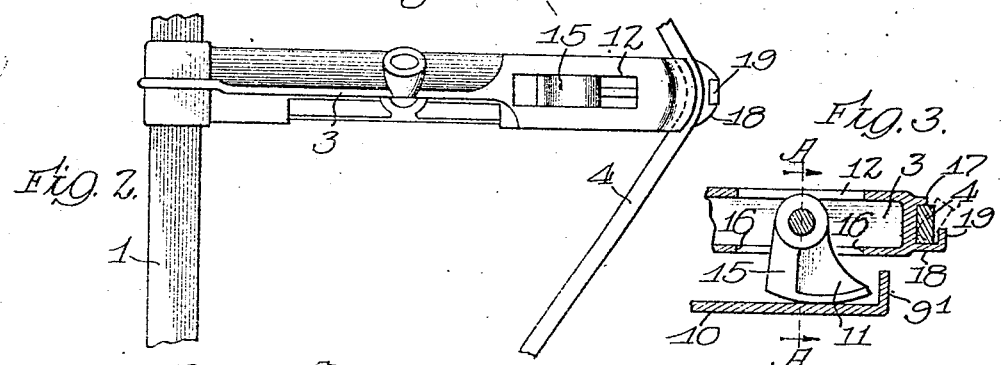
Fig. 2.
Fig. 3.
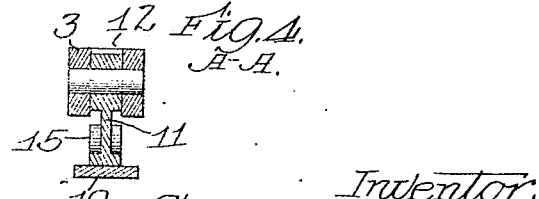
Fig. 4.
A-A.
Inventor:
Chas. F. Huntoon,
By Rummler & Rummler,
Attys
Witnesses:
H. D. Marcus Jr.
R. Bauerle.

UNITED STATES PATENT OFFICE.

CHARLES F. HUNTOON, OF CHICAGO, ILLINOIS, ASSIGNOR TO ELMYR A. LAUGHLIN, OF CHICAGO, ILLINOIS.

THIRD SUSPENSION FOR BRAKE-BEAMS.

1,060,842.

Specification of Letters Patent.

Patented May 6, 1913.

Application filed April 20, 1912. Serial No. 692,077.

*To all whom it may concern:*

Be it known that I, CHARLES F. HUNTOON, a citizen of the United States of America, and a resident of Chicago, county of Cook, State of Illinois, have invented certain new and useful Improvements in Third Suspensions for Brake-Beams, of which the following is a specification.

The main objects of this invention are to provide an improved form of third suspension for brake beams, which is adapted to coact with the other suspensions and the pull of the brake rods to insure that the faces of the brake shoes will remain substantially concentric to the wheels as the brake shoes are shifted to and from engagement with the wheels, regardless of wear or turning down of the contacting surfaces, and to provide improved means on the strut for securing the tension member thereto.

An illustrative embodiment of this invention, as applied to a brake beam of the type described in the patent of C. F. Huntoon, No. 960,935, issued June 7, 1910, is shown in the accompanying drawings, in which:

Figure 1 is a side elevation of a brake beam having a third suspension constructed according to this invention. Fig. 2 is a fragmentary plan view of the brake beam. Fig. 3 is a fragmentary sectional detail showing the arrangement and construction of the cam. Fig. 4 is a section taken on the line A—A of Fig. 3.

The brake beam shown in the drawings comprises the usual compression member 1, with brake-heads 2 at its ends, a long strut 3 as in said Huntoon patent, and a tension member 4. The brake beam is suspended by means of the usual links 5, carried by bracket arms 6 on the truck bolster 7. Brake shoes 8 are secured to the brakeheads 2 in the usual manner.

The third suspension shown in the drawings comprises a flat resilient member or spring 9 secured to the bolster 7, and of sufficient strength to support the end of the strut 3. The spring 9 is below the strut 3 and substantially parallel therewith. In the present construction, the link or shoe of the third suspension of said Huntoon patent is replaced by a cam shaped roller 11 which rides on the spring 9 and is pivotally mounted in the slot 12 formed near the outer end of the strut 3. The cam 11 is shaped so that when the brake beam is shifted toward the wheel it will roll along the part 10 of the member 9 and elevate the outer end of the strut 3 so that the faces 13 of the shoes 8 will be brought into substantially concentric relation with peripheries 14 of the wheels as the brake shoes approach the wheels, and thereby obtain an even engagement of the shoes with the wheels. When the shoes recede from the wheels, the same concentric relation of the shoes and wheels is maintained. The spring 9 has its outer end turned upwardly to form a shoulder 9' against which the cam 11 will abut, and thereby insure against slipping thereof along the spring. The cam 11 is weighted at 15 so that it normally hangs in the position shown in Fig. 3, and always assumes that position when, through vibration or otherwise, it is lifted from the spring. The ends of the slot 12 form limit stops 16 for preventing the cam from being turned too far in either direction to give proper support to the beam.

Lugs or shoulders 17 and 18 are formed on the end of the strut 3 for supporting the tension member 4, being spaced apart a distance equal to the width of the tension member 4. The shoulder 18 is made somewhat longer than the thickness of the tension member and is adapted to be bent up to form a transverse lug 19 at the front of the tension member. When the tension member is once set in between these lugs it is secure against accidental disengagement from the strut, through any jarring of the beam. The tension member 4 is inserted into the seat formed by the lugs 17, 18, and 19 before the ends thereof are secured to the compression member, by first tilting the tension member to the position indicated in dotted outline in Fig. 3 and then tilting it back to a horizontal position. After the beam has been assembled it is secure against disengagement from the strut should the compression member be suddenly strained to an extent that would otherwise tend to separate the tension member and strut.

Although but one specific embodiment of this invention is herein shown and described, it will be understood that some of the details of the construction shown may be altered or omitted without departing from the spirit of this invention, as defined by the following claims.

I claim:—

1. In a third suspension for brake beams, the combination of a brake beam, a supporting member, and a cam interposed between said brake beam and said supporting member for the purpose specified.

2. In a third suspension for brake beams, the combination of a brake beam, a substantially horizontally disposed supporting member, and a cam interposed between said brake beam and said supporting member for the purpose specified.

3. In a third suspension for brake beams, the combination of a brake beam, a resilient supporting member, and a cam interposed between said brake beam and said supporting member, for the purpose specified.

4. In a third suspension for brake beams, the combination of a brake beam, a substantially horizontally disposed supporting member, and a cam carried by said brake beam and adapted to coact with said supporting member, for the purpose specified.

5. In a third suspension for brake beams, the combination of a brake beam having a transversely disposed strut, a substantially horizontally disposed supporting member, and a cam interposed between said supporting member and the end of said strut, for the purpose specified.

6. In a third suspension for brake beams, the combination of a brake beam having a transversely disposed strut, a substantially horizontally disposed supporting member, and a cam pivoted to said strut and adapted to bear upon said supporting member, for the purpose specified.

7. In a third suspension for brake beams, the combination of a brake beam having a transversely disposed strut, a flat resilient supporting member having a portion thereof horizontally disposed below said strut, and a cam carried at the end of said strut and adapted to bear upon the horizontal portion of said supporting member, for the purpose specified.

8. In a third suspension for brake beams, the combination of a brake beam, a substantially horizontally disposed supporting member, a cam carried by said brake beam and adapted to coact with said supporting member, and a shoulder on said supporting member adapted to engage said cam, for the purpose specified.

9. In a third suspension for brake beams, the combination of a brake beam having a transversely disposed strut, a substantially horizontally disposed supporting member, and a cam pivoted to said strut and adapted to bear upon said supporting member, said supporting member having the end thereof upturned to form a shoulder adapted to engage said cam, for the purpose specified.

Signed at Chicago this 18th day of Apr. 1912.

CHARLES F. HUNTOON.

Witnesses:
 EUGENE A. RUMMLER,
 EDWIN PHELPS.